United States Patent [19]
Shepherd

[11] 4,196,869
[45] Apr. 8, 1980

[54] OPEN FACE SPINNING REEL

[75] Inventor: Bob G. Shepherd, West Columbia, S.C.

[73] Assignee: Shakespeare Company, Columbia, S.C.

[21] Appl. No.: 896,792

[22] Filed: Apr. 17, 1978

[51] Int. Cl.² ............................................. A01K 89/01
[52] U.S. Cl. .......................................... 242/84.21 R
[58] Field of Search ................. 242/84.21 R, 84.21 A, 242/84.2 E, 84.2 F

[56] References Cited
U.S. PATENT DOCUMENTS

| | | | |
|---|---|---|---|
| 2,687,855 | 8/1954 | Shakespeare et al. | 242/84.21 R |
| 2,773,655 | 12/1956 | Mandorf | 242/84.21 R |
| 2,879,954 | 3/1959 | Small | 242/84.21 R |
| 2,918,227 | 12/1959 | Mauborgne | 242/84.21 R |
| 3,033,486 | 5/1962 | Wood, Jr. | 242/84.21 R |
| 3,138,344 | 6/1964 | Small | 242/84.21 R |
| 3,144,217 | 8/1964 | Wood, Jr. | 242/84.21 R |

Primary Examiner—Billy S. Taylor
Attorney, Agent, or Firm—Hamilton, Renner & Kenner

[57] ABSTRACT

An open face fishing reel having a line spool with a flyer mounted to rotate concentrically of the line spool. A finger is fixedly supported from the flyer and is curved in general conformity with the outer periphery of the line spool and is inclined axially with respect to the spool in order to project over a selected portion thereof. Rotation of a crank rotates the flyer and causes the finger to pick up and direct retrieved line onto the spool. Means are provided to limit retrorotation of the crank, and limited retrorotation effects optimum axial displacement of the line spool with respect to the flyer, and thereby the pick up finger which is itself moved to a predetermined position circumferentially of the line spool by virtue of the aforesaid limited retrorotation, in order to facilitate unfettered removal of the line from the spool during casting.

4 Claims, 6 Drawing Figures

OPEN FACE SPINNING REEL

BACKGROUND OF THE INVENTION

Spinning and spin casting are characterized by the fact that the reels used in conjunction with these two distinct fishing styles each employs a fixed line spool. That is, in such reels the spool generally remains stationary during both the casting and retrieving process. This offers a distinct advantage over bait casting reels in which the line spools are rotated during both the casting and retrieving processes. When the line spool is required to rotate, static inertia must be overcome at the beginning of the cast to initiate rotation of the spool in response to the momentum of the lure being cast, and at the end of the cast the dynamic inertia of the spool must be quickly dissipated to prevent a backlash. The expertise to dissipate dynamic inertia by the adroit application of the fisherman's thumb against the rotating line spool is an art which can be developed only by diligent and patient practice.

On the other hand, with a fixed spool reel the line simply uncoils axially off the line spool during the cast so that one can develop the requisite expertise with relative ease.

The conventional open face spinning reel is mounted beneath the rod and the rod is grasped in the fisherman's dominant hand with his thumb on top of the rod and with the spacing leg of the reel extending between his second and third fingers on the hand which grasps the rod. To cast, the fisherman first manipulates the crank until the bail is disposed to position the line in proximity to the extending forefinger on the rod-holding hand. The fisherman then engages the line with the pad of that extending index finger and with the other hand flips the bail from the retrieve to the casting position. The lure is then cast by action of the rod with the forefinger on the rod-holding hand restraining the line preparatory to the cast and releasing it at the appropriate time during the casting movement of the rod. To retrieve the line, one need merely rotate the crank on the reel, and the bail is automatically moved from the casting to the retrieving position.

Most bails comprise a metal loop that is pivotally mounted to the flyer which rotatably circumscribes the line spool. In one position the bail extends in an arc across the face of the line spool. So disposed the bail will retrieve line. In its second position the bail is located laterally of the spool, and in this disposition the line may freely uncoil off the spool, as is required during the casting operation.

In conventional closed face reels a conical hood extends from the reel frame forwardly to encompass not only the line spool but also the mechanism by which the line is retrieved. The line enters and leaves the reel through a relatively small aperture axially through the apex of the conical hood.

To the purist the increased frictional resistance inherent to confining the line within the conical hood and forcing it to exit through the relatively small aperture therein leaves a great deal to be desired. However, it is also deemed to be a definite advantage to be able to release the pick up mechanism by simply actuating a thumb button or by retrorotation of the crank arm, as is the situation with closed face reels.

SUMMARY OF THE INVENTION

It is, therefore, a primary object of the present invention to provide an open face fishing reel which does not employ the conventional bail.

It is another object of the present invention to provide an open face fishing reel, as above, in which the line pick up mechanism is moved from the retrieve to the casting position simply by retrorotation of the crank handle.

It is a further object of the present invention to provide an open face fishing reel, as above, in which retrorotation of the crank handle also disposes the line pick up means in the desired location circumferentially of the spool.

It is yet another of the present invention to provide an open face fishing reel, as above, which is relatively uncomplicated and economical to manufacture and maintain.

These and other objects of the invention, as well as the advantages thereof over existing and prior art forms, which will be apparent in view of the following specification are accomplished by means hereinafter described and claimed.

In general, an open face fishing reel embodying the concept of the present invention has a housing. A flyer shaft is rotatably mounted through the housing and a spool shaft is mounted for reciprocating movement within the flyer shaft.

A flyer is affixed to the flyer shaft and is rotatable therewith. A line spool is carried by the spool shaft and is positioned exteriorly and forwardly of the housing so as to be oriented cencentrically with respect to the flyer. A curved finger is mounted on the flyer rotatably to circumscribe the line spool in order to pick up and direct retrieved line onto the spool.

A crank shaft is also rotatably mounted through the housing. A crank arm is secured to the crank shaft exteriorly of the housing by which to effect manual rotation, and retrorotation, of the crank shaft.

A primary drive train is supported in the housing operatively to interconnect the crank shaft to the flyer shaft and thereby effect rotation of the flyer upon rotation of the crank handle.

A secondary drive train is also supported in the housing operatively to interconnect the drive shaft to the spool shaft and thereby effect axial reciprocation of the line spool with respect to the flyer.

Means are provided to permit limited retorotation of the crank shaft, said retrorotation effecting the optimum axial displacement of the line spool beyond the pick up means on the flyer in order to facilitate the unfettered removal of line from the spool during casting.

One preferred embodiment of an open face spinning reel embodying the concept of the present invention is shown by way of example in the accompanying drawings without attempting to show all of the various forms and modifications in which the invention might be embodied; the invention being measured by the appended claims and not by the details of the specification.

DESCRIPTION OF THE PREFERRED EMBODIMENT

Figure 2:
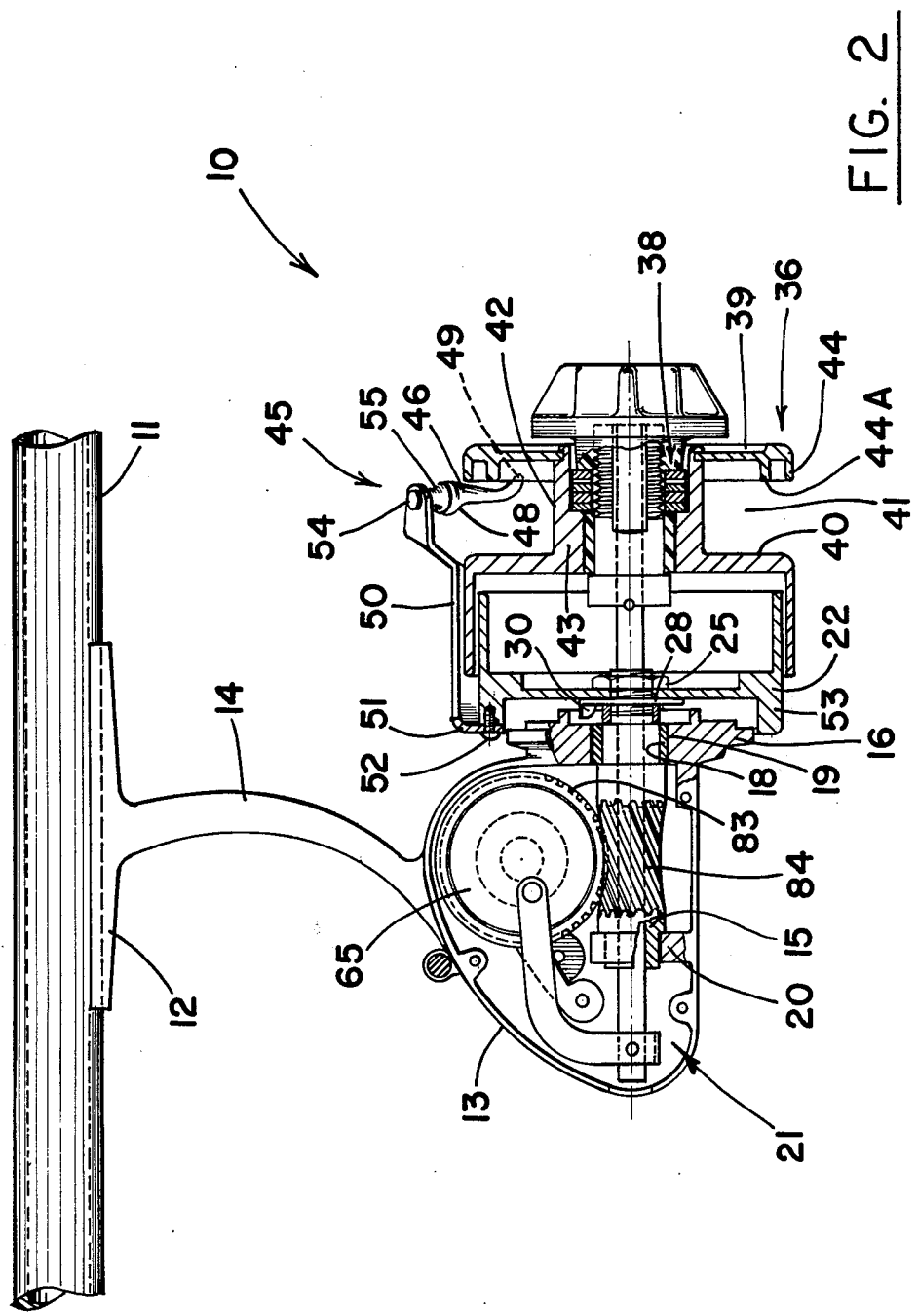
FIG. 2 is a longitudinal cross section taken vertically through the fishing reel depicted in FIG. 1, said reel being schematically depicted relative to a rod and representing the components of the reel as disposed for line retrieval.

A fishing reel of the open face spinning variety and embodying the concept of the present invention is designated by the numeral 10 on the accompanying drawings. The reel 10 is intended to be mounted beneath the handle of a rod—indicated schematically in FIG. 2 at 11—by customary means, not shown, which engage the mounting shoe 12. The mounting shoe 12 is displaced from the reel housing 13 by means of a customary spacing leg 14.

A flyer shaft 15 is rotatably mounted through the forward wall 16 of the housing 13. As represented, a bushing 18 may be press-fit within the aperture 19 through the forward wall 16, and the flyer shaft 15 is rotatably received therein. A pillow block 20 is provided within the cavity 21 of the housing 13 and is disposed in spaced relation rearwardly of the forward wall 16. The flyer shaft 15 is also journaled within the pillow block 20.

Exteriorily of the housing 13 a flyer 22 is secured to the flyer shaft 15 and is rotatable therewith. One common means employed to secure the flyer to the flyer shaft is to provide an end portion 23 of the shaft 15 at a reduced diameter. The annular outer surface of portion 23 can be provided with a flatted surface 24 by which to key the flyer to the shaft. The reduced portion 23 is threaded so that a nut 25 can secure the web wall 26 of the flyer 22 between the nut 25 and the shoulder 28 formed between the flyer shaft 15 and the reduced portion 23 thereof.

A locating tab 30 is also carried by the flyer shaft. Specifically, the tab 30 is located radially outwardly of the flyer shaft 15 and extends axially rearwardly from a washer-like body portion 31 that is non-rotatably carried on the flyer shaft 15. The function of the locating tab 30 will be hereinafter more fully explained in conjunction with the explanation as to the operation of the subject reel.

A spool shaft 35 is mounted for reciprocation within the tubular flyer shaft 15. The line spool 36, though normally non-rotatable with respect to the shaft 35, is connected thereto by an adjustable brake, or drag, mechanism 38 in the conventional fashion. In this way the spool 36 may be selectively permitted to rotate with respect to the shaft 35 so that a fish may run with the line without breaking it even though the flyer 22 is resisting (within a safe margin relative to the strength of the line) removal of the line at the rate required to accommodate the fish. Quite often the flyer 22 is maintained in a stationary position either by the angler's hand or by an antireverse mechanism, as is customarily employed on such reels, and the drag mechanism protects the integrity of the line under such circumstances.

The line spool 36 comprises axially spaced radially extending front and rear flanges 39 and 40, respectively, which define a line-receiving recess 41 therebetween. The radially innermost extent of the recess 41 is defined by the cylindrical outer surface 42 on the hub 43 of the line spool 36.

An annular skirt 44 defines the radially outer periphery of the front flange 39 and extends toward rear flange 40. A second, concentrically inner skirt 44A is also provided to extend rearwardly of the front flange 39 toward the rear flange 40. The more fully hereinafter described interaction between the skirts 44 and 44A with the line pick up and turning mechanism 45 assures the necessary engagement of the fishing line by the turning and pick up mechanism 45 during the transition from the casting to the retrieving operation.

The line pick up and turning mechanism 45 employs a curved finger 46 having a tang end 48 and a free end 49. The tang end 48 is supported from the flyer 22, as by an extension arm 50. The extension arm 50 has a mounting base 51 that may be secured, as by one or more screws 52, to the rim 53 of the flyer 22. The tang end 48 of the finger 46 is, in turn, supported from the extension arm 50, as by the rivet 54 extending transversely through the tang 48 and extension arm 50.

Figure 1:
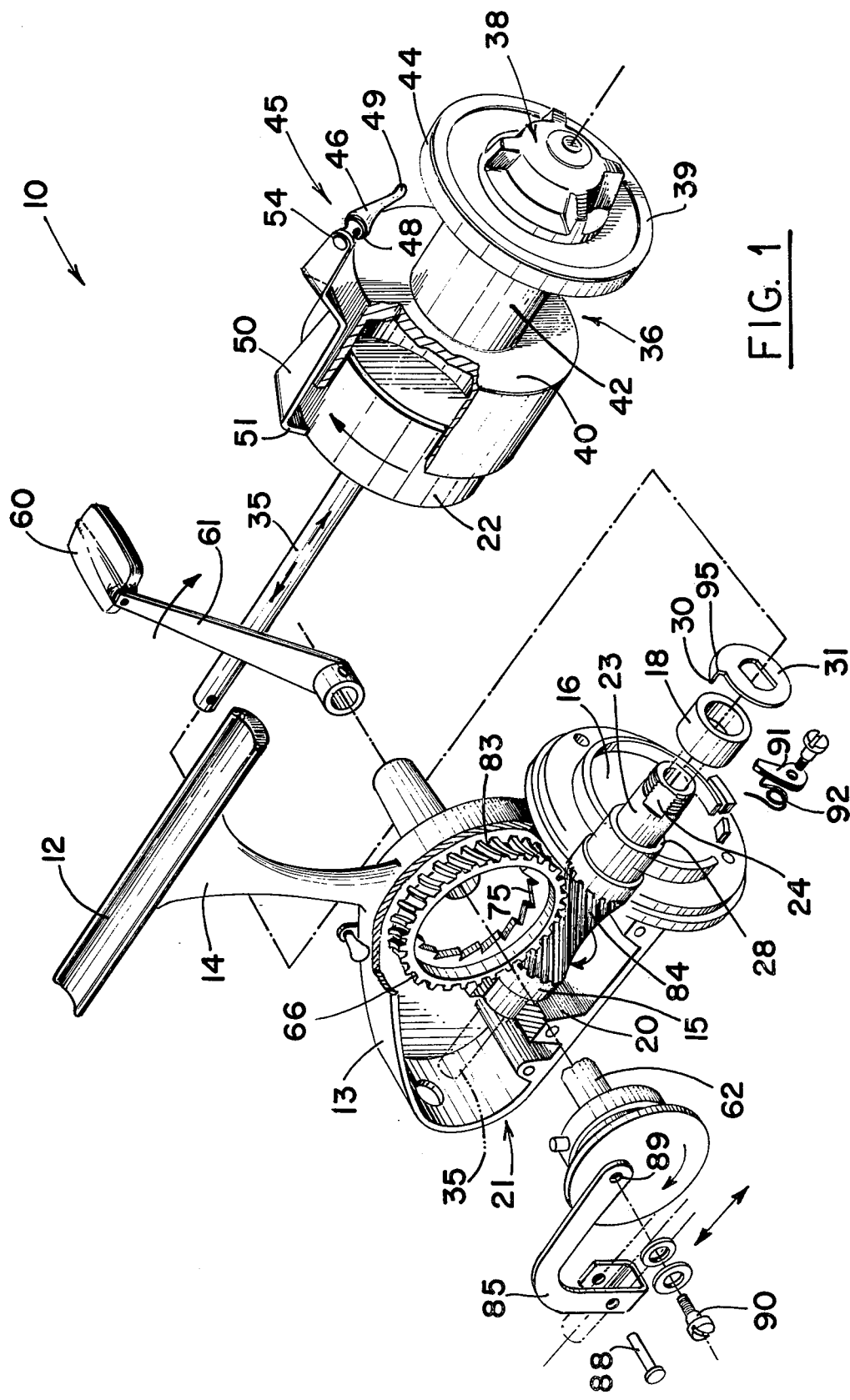
FIG. 1 is an exploded perspective of an open face spinning reel embodying the concept of the present invention.
Figure 6:
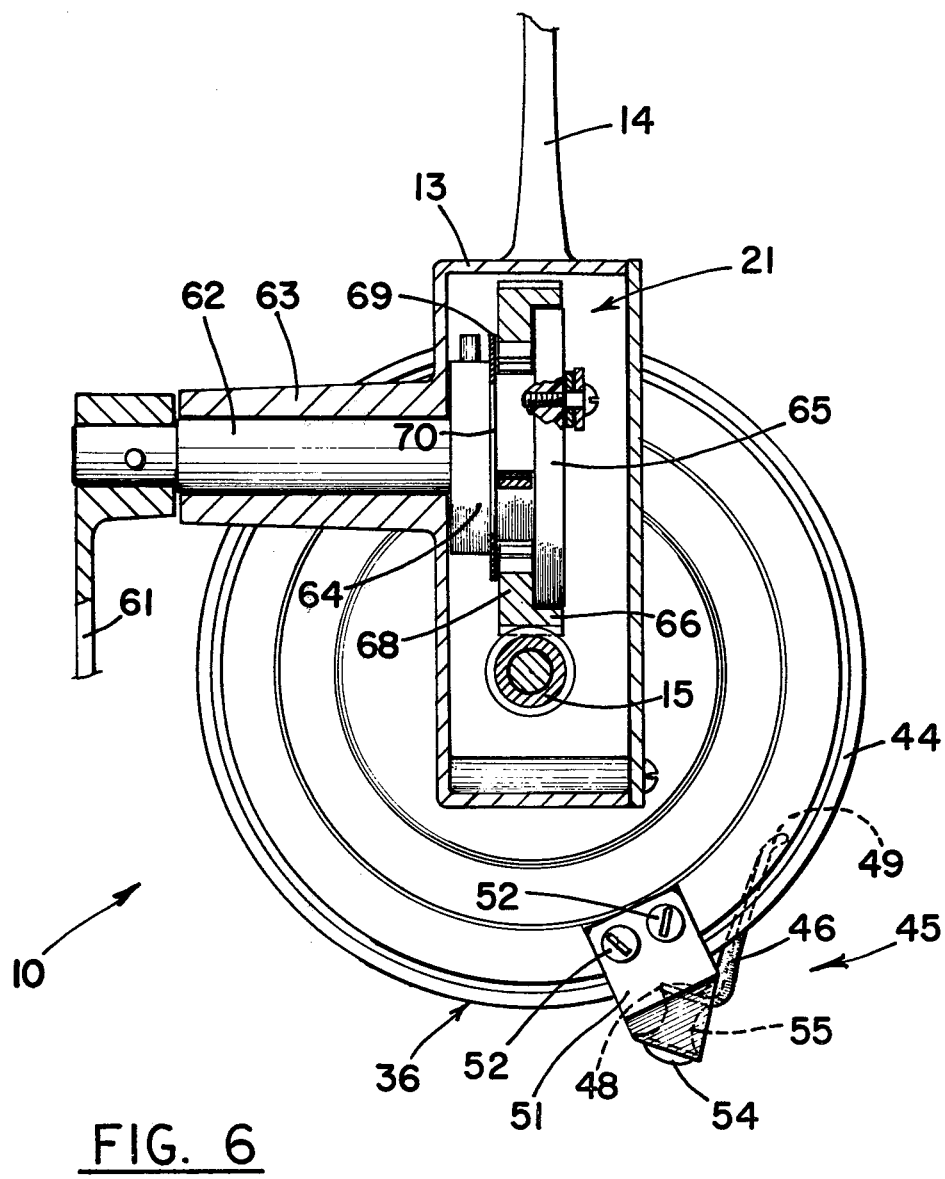

As best seen in FIG. 1, the finger 46 is cantilevered from the tang 48 and is axially inclined with respect to the spool in order to overlie a selected portion thereof. The finger 46 is also curved such that the axial projection thereof substantially conforms to the outer, cylindrical periphery of the line spool 36. As shown in FIG. 6, the tang 48 is supported radially outwardly of the line spool 36 and yet the free end 49 is disposed radially inwardly of the annular skirt 44 in order to extend axially between skirts 44 and 44A (FIG. 2) at times during the reciprocation of the line spool in order to assure engagement of the line after the cast and at the beginning of the retrieval process.

A sheave 55 is rotatably received on the rivet 54 and is located between the tang 48 and the extension arm 50. The sheave serves as a low friction means to direct retrieved line onto the spool 36 in response to rotation of the flyer 22, as will be hereinafter more fully described.

Operation of the reel is effected by manipulation of the handle 60 supported on one end of the crank arm 61, the other end of the crank arm 61 being affixed to a crank shaft 62 that is rotatably received through a hub 63 in the reel housing 13. As such, the crank shaft 62 is oriented in transversely spaced relation with respect to the concentric flyer and spool shafts 15 and 35, respectively.

As is perhaps best depicted in FIG. 6, interiorily of the housing 13 the crank shaft 62 presents a cylindrical barrel portion 64 of greater diameter than the shaft 62, and the axial extremity of the barrel portion 64 distal with respect to the crank arm 61 terminates in a foot flange 65 of even greater diameter than the barrel portion 64. A flanged annulus 66 having radially outwardly directed teeth constitutes a drive gear and is supported on the foot flange 65 so as to be rotatable both with and with respect thereto.

A flange 68 extends radially inwardly from the axially innermost side of the annular drive gear 66 (i.e., that side away from the foot flange 65 and in closer proximity to the crank arm 61) and is normally disposed in contiguous juxtaposition with the axially inner side of the foot flange 65. Embracing engagement of the flange 68 on drive gear 66 between the foot flange 65 and a retaining clip 69 received within the groove 70 in the barrel portion 64 retains the drive gear 66 against axial movement with respect to the shaft 62.

Figure 4:
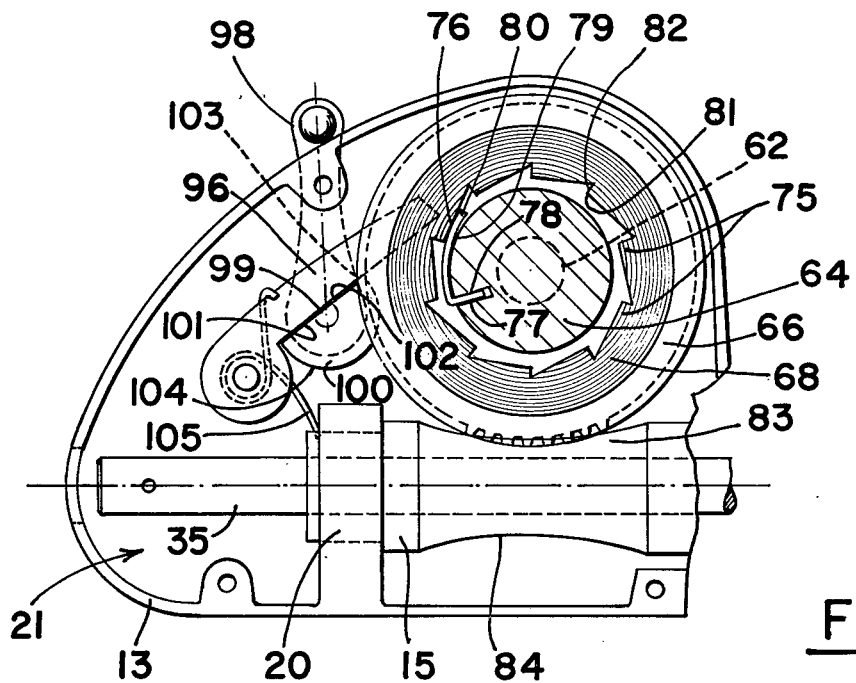
FIG. 4 is an enlarged area of FIG. 2 with the foot flange of the crank shaft broken away to reveal the drive gear and its ratchet connection to the crank shaft.

As best seen in FIG. 4, the radially innermost circumference of the flange 68 is provided with a plurality of serrations 75 which form a ratchet wheel that is integral with the drive gear 66. A pawl 76 is carried by the barrel portion 64 and engages the serrations 75 to assure that the drive gear will rotate with the drive shaft when the crank arm is rotated in one direction and to permit relative rotation with respect to these two elements when the crank arm is retrorotated. A preferred form of pawl 76 comprises a piece of spring steel having an anchor tab 77 received within a radially oriented slot 78 in the barrel portion 64 of the crank shaft 62, and an arcuate arm portion 79, the radius of curvature for which is slightly in excess of that for the cylindrical outer surface of the barrel portion 64. The resilience of the arm portion 79 allows pawl action by permitting the dog end 80 to clear the radially innermost crest 81 of each serration 75 and spring radially outwardly to engage one of the toothed shoulders 82 so that rotation (clockwise as viewed in FIG. 4) of the crank shaft 62 will effect concommitant rotation of the drive gear 66.

The radially outer periphery of the drive gear 66 is provided with worm gear teeth 83 that meshingly interengage with the worm 84 provided on the flyer shaft 15. Thus, rotation of the crank shaft 62 effects rotation of the flyer 22.

A motion transfer link 85 is operatively connected between the foot flange 65 and the spool shaft 35. An acceptable arrangement comprises providing a dog leg link one end of which presents a saddle-clevis 86 the opposed arms of which embrace the spool shaft 35. A pin 88 may be seated in the registered bores through the shaft 35 and the arms of clevis 86.

An eye 89 in the opposite end of the link 85 is rotatably received over a stud means in the form of a machine screw 90 secured to the foot flange 65 eccentrically of the crank shaft 62. In this way rotation of the crank shaft 62 effects reciprocation of the line spool 36 as well as rotation of the flyer 22.

Retrorotation of the crank arm 61 rotates the crank shaft 62—and the barrel portion 64 thereof—counter-clockwise as viewed in FIG. 4. Retrorotation of the crank arm 61 may move the dog end 80 of pawl 86 away from a toothed shoulder 82, but the arcuate arm portion 79 will engage a crest 81 in an attempt to retrorotate the drive gear 66. Retrorotation of the drive gear effects retrorotation of the flyer until the locating tab 30 engages a pawl 91 pivotally mounted on the forward wall 16 of housing 13. Engagement of the tab 30 with pawl 91 during retrorotation of the flyer 22 precludes further retrorotation of the flyer. Thus, the location of the tab 30, and the pawl 91, are chosen such that retrorotation of the flyer 22 is terminated when the pick up and turning mechanism 45 is most appropriately disposed along the circumferential periphery of the line spool 36 for the cast. Generally, it is preferred that the pick up and turning mechanism 45 be disposed at some location in that quadrant opposite the spacing leg 14, but an appropriate spacing tab 30 can be provided to accommodate any particular fisherman's whim in this regard.

It should be appreciated that a spring 92 may be employed biasingly to urge the pawl 91 into a position where it can be engaged by the tab 30 upon retrorotation of the flyer 22. On the other hand, it must also be appreciated that the pawl 91 must not restrict forward rotation of the flyer 22. Accordingly, the tab 30 also presents a cam skirt 93 along which the pawl 91 can ride against the biasing action of the spring 92 to permit unrestricted forward rotation of the flyer 22.

Returning now to an explanation of the retrorotation sequence, once the pawl 91 and tab 30 have lockingly engaged, continued retrorotation of the crank arm 61 cannot effect any further retrorotation of the drive gear 66, and the spring pawl 76 will now slide past the crest 81 of the successive serrations 75. This continued retrorotation of the crank arm 61 translates the spool shaft 35 by virtue of the link 85 connected between the shaft 35 and the foot flange 65.

Figure 3:
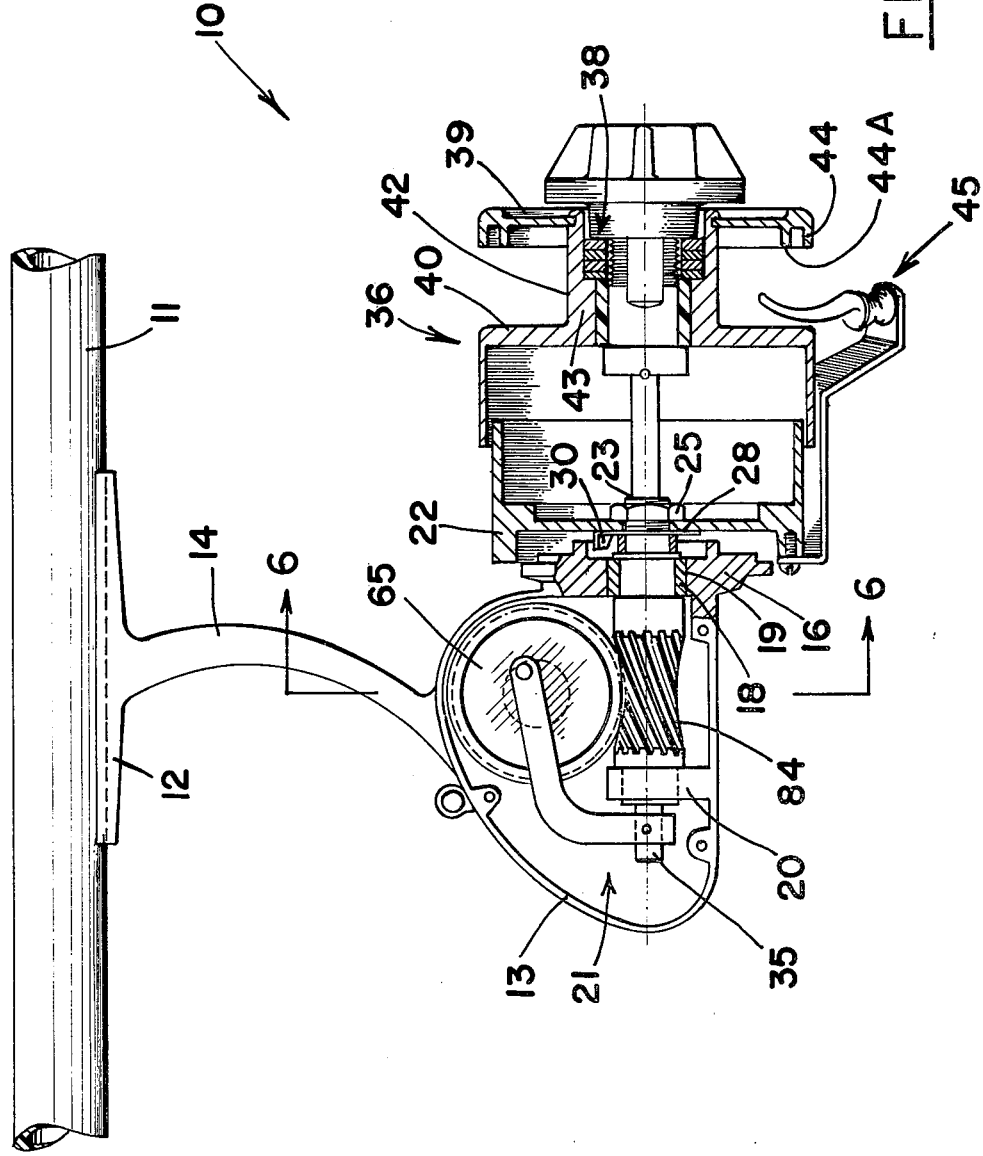
FIG. 3 is a view similar to FIG. 2 but depicting the components of the reel as disposed for casting.
Figure 5:
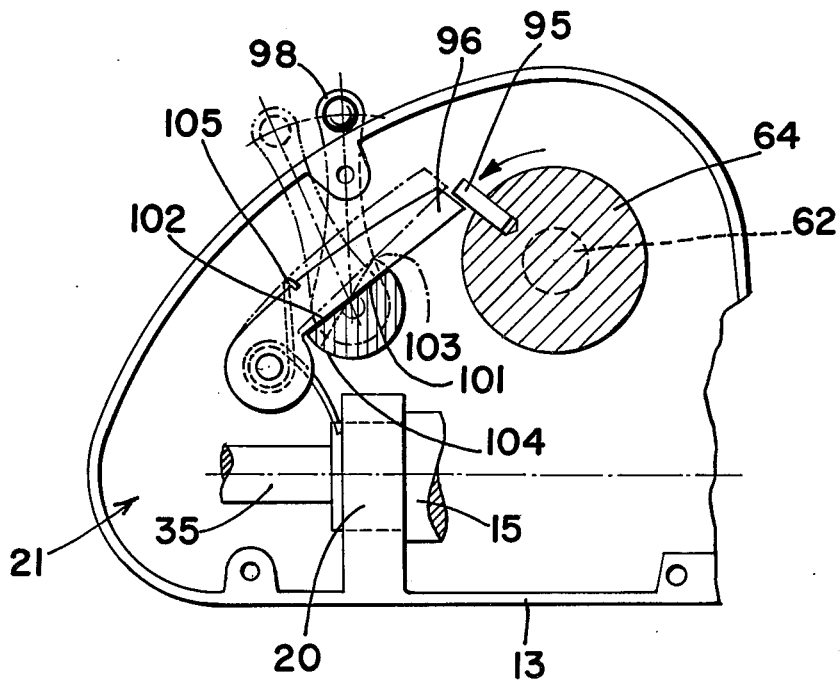
FIG. 5 is a view similar to FIG. 4 but with the drive gear and ratchet broken away to reveal the pawl which controls retrorotation of the crank so as to assure optimum axial displacement of the line spool with respect to the pick up means for casting; and, FIG. 6 is an enlarged, transverse section taken substantially on line 6—6 of FIG. 3.

A stop pin 95 is presented radially from the barrel portion 64 for selective engagement with a manually actuated, two-position pawl 96. When the pawl 96 is in the solid line position depicted in FIG. 5, retrorotation of the crank arm 61 will bring the pin 95 into abutting engagement with the pawl 96. The location of the pin 95 is preferably so chosen that when it engages the pawl 96, the line spool 36 is displaced forwardly to the optimum extent with respect to the flyer 22, as shown in FIG. 3, thereby affording unfettered opportunity for removal of line from the spool during the cast.

The two positions of the pawl 96 are determined by a selector lever 98 located outside the housing 13 and presented from a selector shaft 99 rotatably journaled through the housing 13. Interiorily of the housing the shaft 99 presents a semicylindrical actuating head 100. In the solid line position (FIG. 5) of the selector lever 98, the follower surface 101 on pawl 96 engages the chordal surface 102 of the actuating head 100. As the selector lever 98 is moved from the solid line to the phantom line position (also FIG. 5) the actuating head 100 rotates to bring the lift cam 103—which comprises the intersection of the chordal surface 102 with the semi-cylindrical, outer surface 104 of the actuating head 100—against the follower surface 101 to raise the pawl and thereby allow the stop pin 95 to clear the pawl 96 during rotation of the crank shaft 62.

A biasing spring 105 is preferably provided to maintain the pawl 96 yieldingly in engagement with the actuating head 100.

To recapitulate the operation of the reel 10, rotation of the crank arm 61 in the direction of the arrow on FIG. 1 forces the dog end 80 of the pawl 76 against a toothed shoulder 82 on one of the serrations 75 to rotate the drive gear 66 in the same direction as the crank arm 61 is being rotated. Rotation of the drive gear 66 in this direction turns the worm 84, and the flyer shaft 15 secured thereto, in the direction of the arrow adjacent that component (also FIG. 1).

The flyer 22, also appropriately marked with a directional arrow, rotates with its shaft 15 to retrieve line across the sheave 55 and wind it onto the line spool 36. Rotation of the crank arm 61 in the direction of the arrow effects reciprocation of the line spool 36 beneath the sheave 55 as a result of the link which interconnects the foot flange 65 with the spool shaft 35.

With the line fully retrieved, one prepares to cast by engaging the line with the forefinger of the casting hand in the customary manner and thereafter retrorotates the crank arm 61—i.e., by turning the crank arm 61 in a direction opposite the arrow appearing on FIG. 1. Retrorotation of the crank arm tends to disengage the dog end 80 of pawl 76 from the shouldered teeth 82 on drive gear 66, and the resilient arm portion 79 is urged against a crest 81 of the serrations 75 to effect retrorotation of the drive gear 66—and thereby, retrorotation of worm 84, flyer shaft 15 and the flyer 22. When the line pick up and turning mechanism 45 is disposed in a position where it is least likely to interfere with the line during the casting process—this is normally deemed to be someplace within that circumferential quadrant of the line spool which lies diametrically opposite the spacing leg—continued retrorotation of the flyer 22 brings the locating tab 30 into abutting engagement with the pawl 91. Retrorotation of the flyer 22 is thereby arrested to determine the location of the pick up and turning means for the cast.

The arresting contact of the tab 30 with the pawl 91 precludes further retrorotation of not only the flyer 22 but also the flyer shaft 15, the worm 84 and the drive gear 66. Hence, continued retrorotation of the crank arm 61 requires relative rotational movement of the crank shaft 62 with respect to the drive gear 66, and that can be accomplished by virtue of the ratchet action achieved between pawl 76 and the serrations 75. Continued retrorotation of crank shaft 62, as viewed in FIGS. 4 and 5, drives the pawl 76 past the successive crest 81 until such time as the stop pin 95 engages the pawl 96. This occurs when the line spool has been displaced to the optimum axial extent forwardly with respect to the flyer 22 and thus the line pick up and turning mechanism 45 carried on the flyer 22. When the line spool 36 and the line pick up and turning mechanism 45 is so disposed the fisherman may cast the lure, and the line will uncoil axially from the spool 36 without interference.

Upon completion of the cast, line retrieval is accomplished by forward rotation of the crank arm 61. Rotation of the crank arm moves the dog end 80 of pawl 76 into abuttment with a toothed shoulder 82, thereby operatively engaging that drive train which effects rotation of the flyer 22 with respect to the spool—i.e., from the drive shaft 62 through drive gear 66, worm 84 and flyer shaft 15 to the flyer 22. The same rotation also effects axial translation of the spool with respect to the flyer by virtue of a second drive train—i.e., from the drive shaft 62 through link 85 and spool shaft 35 to the spool 36.

As the spool reciprocates toward the flyer a point is reached where the free end 49 on the finger 46 of the pick up and turning mechanism 45 extends between the concentric skirts 44 and 44A on the front flange 39 of the spool 36. Continued rotation of the flyer against any resistance imparted by the line will cause the line to slide along the curved finger 46 and drop into this sheave 55. The resistance offered against the lure and line by the water is generally sufficient and can be augmented by momentarily raising the tip of the rod—an almost automatic response to anyone familiar with spin fishing.

Continued rotation of the crank arm 61 causes the line pick up and turning mechanism 45 rotationally to circumscribe the axially reciprocating line spool and thereby retrieve the line and level wind the line onto the spool.

It should now be apparent to those skilled in this art that the aforedescribed open face fishing reel employs a unique line pick up and turning mechanism and that the novel operating mechanism of the reel has been conceived: to effect line pick up and retrieval upon rotation of the crank; to dispose the line pick up and turning mechanism in the most advantageous location with respect to the line spool for casting upon retrorotation of the crank; and, otherwise to accomplish the objects of the invention.

I claim:

1. In an open face fishing reel: a housing, a flyer shaft rotatably mounted from said housing, a spool shaft mounted for reciprocating movement within said flyer shaft, a line spool mounted on said spool shaft, a flyer mounted on said flyer shaft exteriorly of said housing to rotate concentrically of said line spool, means mounted on said flyer to pick up and direct retrieved line onto said spool, a crank shaft rotatably mounted from said housing, a crank arm secured to said crank shaft for manual rotation thereof, a primary drive train operatively interconnecting said crank shaft to said flyer shaft in order to effect rotation of said flyer upon concomitant rotation of said crank, a second drive train operatively interconnecting said crank shaft to said spool shaft in order to effect axial reciprocation of said line spool with respect to said flyer upon concomitant rotation of said crank, a locating tab means being secured to said flyer shaft, pawl means mounted on said housing, engagement of said tab means with said pawl defining a limit to the retrorotation of said flyer upon retrorotation of the crank handle to position the pick-up means under the spool, a second pawl means mounted on said housing, and stop means mounted on one of said rotating shafts to engage said second pawl upon further retrorotation of said crank arm in order to determine the axial position of said line spool upon the maximum permitted retrorotation of said crank handle.

2. In an open face fishing reel, as set forth in claim 1, in which said primary drive train comprises a worm presented from said flyer shaft interiorily of said housing, a drive gear meshingly engaging said worm, and means to effect rotation of said drive gear in response to rotation of said crank shaft, a ratchet means being interposed between said drive gear and said crank shaft to assure rotation of said drive gear in response to rotation of said crank shaft and to permit relative retrorotation of said crank shaft with respect to said drive gear.

3. In an open fishing reel, as set forth in claim 2, a finger being fixedly supported from said flyer to comprise the means by which to pickup and direct retrieved line onto said spool, said finger being curved in general conformity with the outer configuration of said line spool and being inclined axially with respect to said line spool in order to project over a selected portion thereof.

4. In a fishing reel, as set forth in claim 3, a line spool having axially spaced front and rear flanges defining a line receiving recess therebetween, at least said front flange having an annular skirt portion which defines the radially outer periphery thereof, said skirt portion extending toward said rear flange, said means to pick up and direct line onto said spool comprising a curved finger having a tang end and a free end, the tang end being secured to said flyer to support the finger in cantilevered fashion therefrom, the free end of said finger being capable of moving helically about said spool as a result of the compound movement achieved by the relative rotation and reciprocation of the flyer with respect to the line spool, the free end of said finger traversing said spool from a position radially inwardly of the annular skirt to a portion clear of said skirt in closer proximity to said rear flange.

* * * * *